US012638404B2

(12) United States Patent
Zhang et al.

(10) Patent No.: US 12,638,404 B2
(45) Date of Patent: May 26, 2026

(54) BATTERY INSPECTION APPARATUS AND METHOD, AND BATTERY PRODUCTION DEVICE

(71) Applicant: CONTEMPORARY AMPEREX TECHNOLOGY CO., LIMITED, Ningde (CN)

(72) Inventors: Fenglin Zhang, Ningde (CN); Jianlin Liu, Ningde (CN); Hongyu Zheng, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 19/298,527

(22) Filed: Aug. 13, 2025

(65) Prior Publication Data

US 2025/0369902 A1     Dec. 4, 2025

Related U.S. Application Data

(63) Continuation of application No. PCT/CN2023/141903, filed on Dec. 26, 2023.

(30) Foreign Application Priority Data

Jun. 30, 2023     (CN) .......................... 202321707871.8

(51) Int. Cl.
  *G01N 23/04*     (2018.01)
  *G01N 23/083*     (2018.01)
  *G01N 23/18*     (2018.01)
(52) U.S. Cl.
  CPC ........... *G01N 23/04* (2013.01); *G01N 23/083* (2013.01); *G01N 23/18* (2013.01);
  (Continued)

(58) Field of Classification Search
  CPC ......... A61B 6/032; A61B 6/08; A61B 6/4035; A61B 6/4405; A61B 6/4435;
  (Continued)

(56) References Cited

U.S. PATENT DOCUMENTS 11,022,569 B2     6/2021   Kang et al.
2018/0132800 A1*  5/2018   Wang ........................ A61B 6/06
  (Continued)

FOREIGN PATENT DOCUMENTS

CN         1745296 A       3/2006
CN       103743361 A       4/2014
  (Continued)

OTHER PUBLICATIONS

ISR for PCT/CN2023/141903 mailed Mar. 12, 2024.
  (Continued)

*Primary Examiner* — Irakli Kiknadze
(74) *Attorney, Agent, or Firm* — Ladas & Parry, LLP

(57)          ABSTRACT

The battery inspection apparatus includes a bearing assembly, a pulsed ray source, a detector and a first drive assembly. The bearing assembly is configured to bear a battery under test and drive the battery under test to move along a first direction. The pulsed ray source is configured to emit a detection ray in a pulsed manner toward a to-be-inspected region of the battery. The detector is disposed opposite the pulsed ray source, where the two are located on two sides of the bearing assembly, respectively, and the detector receives the detection ray emitted by the pulsed ray source and penetrating the to-be-inspected region of the battery under test. The first drive assembly is connected to both the pulsed ray source and the detector and the first drive assembly is configured to drive the pulsed ray source and the detector to acquire detected images of the to-be-inspected region.

19 Claims, 6 Drawing Sheets

400

(52) U.S. Cl.
CPC ................ *G01N 2223/3303* (2013.01); *G01N 2223/3306* (2013.01); *G01N 2223/3308* (2013.01); *G01N 2223/401* (2013.01); *G01N 2223/50* (2013.01); *G01N 2223/611* (2013.01)

(58) Field of Classification Search
CPC ... A61B 6/4447; A61B 6/4452; A61B 6/4078; A61B 6/4085; A61B 6/4291; A61B 6/482; A61B 6/547; A61B 6/4417; A61B 6/025; A61B 6/035; A61B 6/4258; A61B 6/4208; A61B 6/037; A61B 6/0492; A61B 6/4014; A61B 6/5235; A61B 6/4028; A61B 6/4482; A61B 6/4266; A61B 6/504; A61B 6/486; A61B 6/4476; A61B 6/466; A61B 6/56; A61B 6/481; A61B 6/485; A61B 6/587; A61B 6/542; A61B 6/461; G01T 1/20182; G01T 1/22; G01T 1/20184; G01T 1/2019; G01T 1/20183; G01T 1/20185; G01T 1/20181; G01T 7/00; G01N 23/2255; G01N 23/046; G01N 2223/419; G01N 2223/108; G01N 2223/505; G01N 23/04; G01N 23/083; G01N 2223/646; G01N 2223/3303; G01N 23/18; G01N 2223/408; G01N 2223/1016; G01N 2223/422; G01N 2223/401; G01N 2223/643; G01N 2223/304; G01N 21/95; G01N 21/88; G01N 2223/3308; G01N 2223/302; G01N 2223/3306; G01N 2223/611; G01N 2223/307; G01N 2223/33; G01N 2223/645; G01N 2223/50; H05G 1/10; H05G 1/12; G01B 21/16; G01B 15/00; H01M 10/4285; H01M 10/0525; H01M 10/0587; H01M 2220/20; H01M 10/045; Y02P 70/50; Y02E 60/10; G06T 3/60; G06T 7/0008; G06T 11/008; G06T 7/0004; G06T 2207/20044; G06T 2211/436; G06T 2207/20084; G06T 2207/10081; G06T 2207/10116; G06T 7/50; G06T 7/80; G06T 7/0002; G06T 2207/30168; G06T 2207/30108; G06V 10/764; G06V 10/26; G06V 10/40; G06V 20/52; G06V 20/50; G06V 2201/06; G06N 3/09; G06N 3/084; G06N 3/0455; B07C 5/3416; B07C 2501/0054
USPC ............................................. 378/57, 58, 62
See application file for complete search history.

(56)                References Cited

U.S. PATENT DOCUMENTS

| 2020/0363344 | A1* | 11/2020 | Heo | G01N 23/18 |
| 2023/0251212 | A1* | 8/2023 | Wagner | G01N 23/18 |
| | | | | 382/141 |
| 2023/0258582 | A1* | 8/2023 | Sakai | G01N 23/046 |
| | | | | 378/20 |
| 2024/0054617 | A1* | 2/2024 | Tsuchiya | A61B 6/4291 |
| 2024/0133682 | A1* | 4/2024 | Zhang | G01B 21/16 |
| 2024/0255443 | A1* | 8/2024 | Matsubara | G01N 23/083 |
| 2024/0255444 | A1* | 8/2024 | Matsubara | A61B 6/4429 |
| 2024/0265577 | A1* | 8/2024 | Shin | G06T 7/80 |

FOREIGN PATENT DOCUMENTS

| CN | 112629442 | A | 4/2021 |
| CN | 114609164 | A | 6/2022 |
| CN | 115728327 | A | 3/2023 |
| CN | 115839965 | A | 3/2023 |
| CN | 218865808 | U | 4/2023 |
| CN | 218995206 | U | 5/2023 |
| JP | 2011232057 | A | 11/2011 |
| JP | 2020085690 | A | 6/2020 |

OTHER PUBLICATIONS

Written Opinion or PCT/CN2023/141903 mailed Mar. 12, 2024.
Extended Search Report from corresponding European Patent Application No. 23943476.4 dated Apr. 8, 2026.

* cited by examiner

400

400

Battery production device 700

Battery detection apparatus 400

800

1

BATTERY INSPECTION APPARATUS AND METHOD, AND BATTERY PRODUCTION DEVICE

CROSS-REFERENCE TO RELATED APPLICATIONS

This application is a continuation of International application PCT/CN2023/141903 filed on Dec. 26, 2023 that claims priority to Chinese Patent Application No. 202321707871.8, filed on Jun. 30, 2023. The content of these applications is incorporated herein by reference in its entirety.

TECHNICAL FIELD

This application relates to the field of battery technologies, and more particularly, to a battery inspection apparatus and method, and a battery production device.

BACKGROUND

Energy conservation and emission reduction are key to the sustainable development of the automotive industry. Due to their energy-saving and environmentally friendly advantages, electric vehicles have become an important component of the sustainable development of the automotive industry. For electric vehicles, battery technology is an important factor in connection with their development.

During the production process, batteries may develop various internal defects, such as electrode wrinkling, head folding, electrode cracking, electrode dark marks, unqualified electrode misalignment, and excessive electrode gap. These internal defects can affect the quality and safety of batteries. Therefore, detecting internal defects in batteries is of great significance. Currently, the detection of internal defects in batteries is typically performed through manual observation of the appearance, and therefore has low accuracy.

SUMMARY

This application aims to address at least one of the technical problems existing in the background. To this end, an objective of this application is to provide a battery inspection apparatus and method, and a battery production device to alleviate the issue of low accuracy in detecting internal defects in batteries in the related art.

An embodiment of a first aspect of this application provides a battery inspection apparatus including a bearing assembly, a pulsed ray source, a detector, and a first drive assembly. The bearing assembly is configured to bear a battery under test and drive the battery under test to move along a first direction; the pulsed ray source is configured to emit a detection ray in a pulsed manner toward a to-be-inspected region of the battery under test on the bearing assembly; the detector is disposed opposite the pulsed ray source, where the two are located on two sides of the bearing assembly, respectively, and the detector receives the detection ray emitted by the pulsed ray source and penetrating the to-be-inspected region of the battery under test; and the first drive assembly is connected to both the pulsed ray source and the detector, where the first drive assembly is configured to drive the pulsed ray source and the detector to rotate along a circumferential direction of a first rotation axis to acquire detected images of the to-be-inspected region.

In the technical solution of the embodiments of this application, with the bearing assembly, the pulsed ray source, and the first drive assembly provided, ray detection can be performed on the to-be-inspected region of the battery under test in a pulsed scanning manner at different positions and different angles to obtain detected images for three-dimensional reconstruction, thereby improving the accuracy of image detection. The cooperation of the pulsed ray source, the bearing assembly, and the first drive assembly can enable online detection, which can be synchronized with the production takt of batteries, thereby improving detection efficiency.

In some embodiments, the bearing assembly includes a tray and a second drive assembly. The tray is configured to bear one or more batteries under test; and the second drive assembly is connected to the tray, where the second drive assembly includes a translation unit, where the translation unit is configured to drive the tray to translate along the first direction. With the second drive assembly provided to drive the tray to translate, the battery under test can be automatically moved into and out of the ray range between the pulsed ray source and the detector, thereby enabling automatic transfer and detection of the battery under test, adapting to the battery production rhythm, and improving detection efficiency.

In some embodiments, the second drive assembly further includes a rotation unit, where the rotation unit is configured to drive the tray to rotate along a circumferential direction of a second rotation axis, and the second rotation axis is a direction from a surface of the tray toward the battery under test and perpendicular to the first direction. With the second drive assembly provided to drive the tray to translate, the battery under test can be automatically moved into and out of the ray range between the pulsed ray source and the detector, thereby enabling automatic transfer and detection of the battery under test, adapting to the battery production rhythm, and improving detection efficiency.

In some embodiments, the battery under test includes two first surfaces disposed opposite each other and first side surfaces connected to the two first surfaces, respectively, the first side surface being a side surface at which a short edge of the first surface is located, where the second rotation axis being perpendicular to the first surface; and the rotation unit is configured to drive the tray to rotate such that a projection of the first side surface on a surface of the tray forms a first included angle $\alpha$ with the first direction, satisfying $0 < \alpha < 90°$. With the rotation unit provided, the position of the battery under test can be adjusted so that the first side surface of the battery under test can be positioned at an appropriate angle within the ray range between the pulsed ray source and the detector, thereby adjusting the incident angle of the rays and switching between a plurality of to-be-inspected regions. This helps to improve the quality of the acquired images of the battery under test and enhance detection efficiency.

In some embodiments, the first included angle $\alpha$ satisfies $20° \le \alpha \le 45°$. Limiting the value of the first included angle to an appropriate range can improve the imaging quality of the to-be-inspected region, facilitating an increase in the accuracy of subsequent image recognition and thereby enhancing the accuracy of defect detection for the battery under test.

In some embodiments, the bearing assembly includes a plurality of trays spaced along the first direction, the translation unit drives the plurality of trays to translate such that to-be-inspected regions of batteries under test on two adjacent trays are both located within the ray range between the pulsed ray source and the detector, and the to-be-inspected region is located at a corner of the battery under test. With the plurality of trays provided and the movement of the trays controlled by the second drive assembly, synchronous detection of a plurality of batteries under test can be achieved, improving battery detection efficiency.

In some embodiments, the translation unit is configured to make a minimum spacing $L_1$ between the batteries under test on the two adjacent trays along the first direction satisfy: $0 < L_1 \le 2$ mm. With the movement of the trays controlled through the translation unit, the batteries under test on the adjacent trays can maintain a reasonable distance, enabling improved detection efficiency while reducing waste of rays.

In some embodiments, a ray absorption rate of the tray for the detection ray is less than a minimum ray absorption rate of the battery under test for the detection ray. With the ray absorption rate of the tray set to be less than the minimum ray absorption rate of the battery under test for the detection ray, the influence of the tray on the detection ray can be reduced, thereby improving the accuracy of the inspection results.

In some embodiments, a material of the tray includes carbon fiber. The inclusion of carbon fiber in the tray material can reduce the absorption of detection ray by the tray, thereby mitigating adverse effects on inspection results and reducing the processing load for subsequent image recognition, and improving detection accuracy.

In some embodiments, the tray includes a protective layer on a side surface facing towards the battery under test, and a surface roughness of the protective layer is less than a preset threshold. With the protective layer provided on the side surface of the tray facing towards the battery under test, wear on the battery under test by the tray can be reduced, thereby more effectively mitigating damage to the battery under test during the detection process.

In some embodiments, the bearing assembly further includes a plurality of stoppers movably connected to the tray and spaced apart, and the plurality of stoppers are configured to clamp the battery under test. With the plurality of movably connected stoppers provided, the clamping needs of batteries under test of different sizes can be accommodated, and the battery under test can be fixed more conveniently, thereby expanding the application range of the battery inspection apparatus.

In some embodiments, the battery inspection apparatus further includes a rotary table, the pulsed ray source and the detector are fixedly connected to the rotary table, and the first drive assembly drives the rotary table to rotate along a circumferential direction of the first rotation axis. With the rotary table for fixing the pulsed ray source and the detector provided, the positional stability of the pulsed ray source and the detector can be maintained during detection, saving time for repositioning and improving detection efficiency and detection accuracy.

In some embodiments, a maximum rotation angle $\lambda$ along a circumferential direction of the pulsed ray source and the detector around the first rotation axis satisfies $45° \le \lambda \le 180°$. Limiting the maximum rotation angle of the pulsed ray source and the detector to an appropriate range can balance the image quality of detection imaging and detection efficiency, better adapting to the production takt of batteries.

In some embodiments, the detector is a CMOS detector. Using the CMOS detector can allow for better cooperation with the pulsed ray source, achieving fast imaging while maintaining imaging quality, thereby improving the detection efficiency of the battery under test.

In some embodiments, a maximum size of a focus of the pulsed ray source is less than or equal to 80 microns. Specifically limiting the magnitude of the focus size can better match the detection precision of the battery inspection apparatus with the dimensions of the battery under test, thereby improving detection accuracy and detection efficiency.

In some embodiments, the battery inspection apparatus further includes an image processing unit, where the image processing unit is in signal connection with the detector to identify detected images acquired by the detector. With the image processing unit provided to receive an image signal generated by the detector and identify the detected images to output an inspection result of the battery under test, automatic detection of an internal defect in the battery under test can be achieved, improving the automation level and detection efficiency of the battery inspection apparatus.

An embodiment of a second aspect of this application provides a battery production device including the battery inspection apparatus according to the embodiments described above.

An embodiment of a third aspect of this application provides a battery inspection method using the battery inspection apparatus. The method includes: moving a battery under test to a preset position; acquiring a plurality of detected images of a to-be-inspected region of the battery under test and identifying the detected images; and determining an inspection result of the battery under test based on an identification result.

In some embodiments, the identifying the detected images includes: performing three-dimensional reconstruction on the detected images; preprocessing slice images obtained from the three-dimensional reconstruction; and capturing a vertex of a cathode and a vertex of an anode in the preprocessed image, drawing lines for the cathode and the anode, and determining a cathode-anode misalignment and a cathode-anode spacing value.

In some embodiments, the determining the inspection result of the battery under test based on an identification result includes: comparing the cathode-anode misalignment and the cathode-anode spacing value with a preset cathode-anode misalignment threshold and a preset cathode-anode spacing value threshold, respectively; and determining the inspection result of the battery under test based on a comparison result.

The above description is merely an overview of the technical solutions of this application. To enable a clearer understanding of the technical means of this application and to implement them in accordance with the content of the specification, and to make the above and other objects, features, and advantages of this application more apparent and understandable, specific embodiments of this application are provided below.

BRIEF DESCRIPTION OF DRAWINGS

In the drawings, unless otherwise specified, identical reference numerals throughout a plurality of drawings denote identical or similar components or elements. These accompanying drawings may not necessarily be drawn to scale. It should be understood that these accompanying drawings illustrate only some embodiments disclosed in this application and should not be construed as limitations on the scope of this application.

Figure 1:
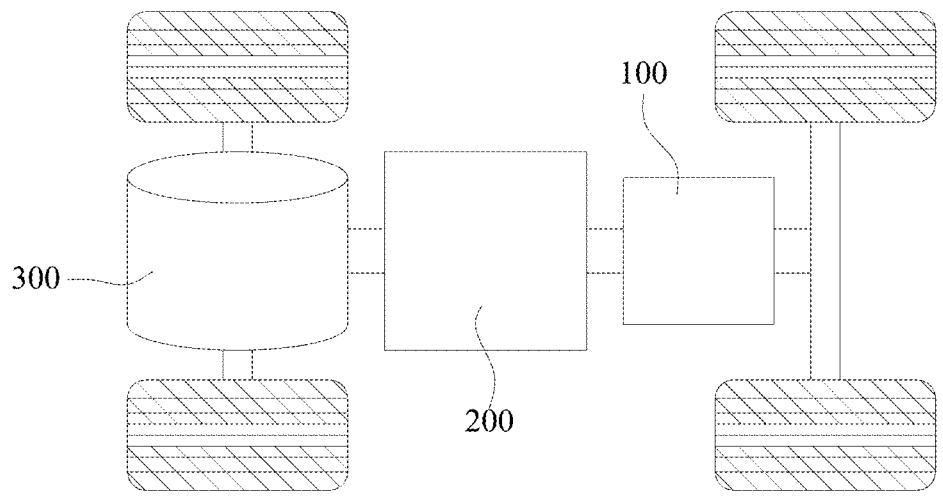
FIG. 1 is a schematic structural diagram of a vehicle according to some embodiments of this application.

DESCRIPTION OF REFERENCE SIGNS vehicle 1000;

battery 100; controller 200; motor 300;

box 10, first portion 11, second portion 12; battery cell 20;

battery inspection apparatus 400, battery under test 401, first battery under test 401A, second battery under test 401B, to-be-inspected region 4011, first surface 4012, first side surface 4013, bearing assembly 410, tray 411, first tray 411A, second tray 411B, second drive assembly 412, translation unit 4121, rotation unit 4122, stopper 413, pulsed ray source 420, detection ray 421, detector 430, first drive assembly 440, rotary table 450, image processing unit 460, first rotation axis 500, second rotation axis 600, battery production device 700, and battery inspection method 800.

DETAILED DESCRIPTION

The embodiments of the technical solutions of this application will be described in detail below with reference to the accompanying drawings. The following embodiments are merely intended for a clearer description of the technical solutions of this application and therefore are used as examples, which do not constitute limitations on the protection scope of this application.

Unless otherwise defined, all technical and scientific terms used herein have the same meanings as commonly understood by those skilled in the technical field of this application. The terms used herein are for the purpose of describing specific embodiments only and are not intended to limit this application. The terms "include" and "have" and any variations thereof in the specification, claims, and the above description of the drawings of this application are intended to cover non-exclusive inclusion.

In the description of the embodiments of this application, technical terms such as "first" and "second" are used only to distinguish between different objects and should not be understood as indicating or implying relative importance or implicitly indicating the number, specific order, or primary-secondary relationship of the technical features indicated. In the description of the embodiments of this application, "a plurality of" means two or more, unless otherwise explicitly and specifically defined.

In this specification, reference to "embodiment" means that specific features, structures, or characteristics described with reference to the embodiment may be incorporated in at least one embodiment of this application. The appearance of this phrase in various places in the specification does not necessarily refer to the same embodiment, nor is it a separate or alternative embodiment mutually exclusive with other embodiments. Persons skilled in the art explicitly and implicitly understand that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. Additionally, the character "/" herein generally indicates that the associated objects before and after are in an "or" relationship.

In the description of the embodiments of this application, the term "a plurality of" refers to two or more (including two), and similarly, "a plurality of groups" refers to two or more groups (including two groups), and "a plurality of pieces" refers to two or more pieces (including two pieces).

In the description of the embodiments of this application, technical terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", and "circumferential" indicate orientations or positional relationships based on the orientations or positional relationships shown in the drawings. These are used only to facilitate the description of the embodiments of this application and simplify the description, and do not indicate or imply that the referred device or element must have a specific orientation, be constructed, and operated in a specific orientation, and therefore should not be construed as limitations on the embodiments of this application.

In the description of the embodiments of this application, unless otherwise explicitly specified and defined, technical terms such as "install", "interconnect", "connect", and "fix" should be understood in a broad sense. For example, it may be a fixed connection, a detachable connection, or an integral connection. It may be a mechanical connection or an electrical connection. It may be a direct connection or an indirect connection through an intermediate medium, or it may be the internal communication or interaction relationship between two elements. For those of ordinary skill in the art, the specific meanings of the above terms in the embodiments of this application can be understood based on specific circumstances.

The position and state of electrode plates within batteries have significant impact on the performance and safety of batteries. Lithium-ion batteries are used as an example. The cathode-anode electrode plate spacing and the cathode-anode electrode plate misalignment inside batteries are important factors affecting the safety performance of wound battery cells. Regarding the cathode-anode electrode plate spacing: during the charging and discharging process of a lithium battery, when the cathode-anode electrode plate spacing is large, lithium ions cannot fully intercalate into anode channels, leading to the accumulation of some lithium ions and thus lithium precipitation, which poses significant safety risks. Therefore, the cathode-anode electrode plate spacing in batteries should not be too large. Regarding the cathode-anode electrode plate misalignment: during the charging and discharging process of a lithium battery, lithium ions intercalate and deintercalate back and forth between cathode and anode electrode plates. However, when lithium ions deintercalate from the cathode but there are insufficient anode channels for intercalation, lithium ion accumulation and lithium precipitation are likely caused, imposing certain product safety risks. Therefore, it is necessary to detect the position and state of electrode plates inside batteries to promptly identify internal defects in batteries and reduce the outflow of defective batteries.

In the related art, X-rays are used to inspect electrode plates inside batteries. For example, for laminated batteries, X-rays are used at a specific incident angle to detect the cathode-anode misalignment and spacing value of a laminated battery to determine whether the battery is qualified. However, this method has detection blind spots, so that some defective products cannot be detected. Additionally, offline CT devices are used to rotate the battery 360° for imaging reconstruction so as to perform detection, but this requires a long time, resulting in low detection efficiency and high detection costs. This makes it incompatible with the production takt of batteries. Moreover, the rotation of the battery during the process may cause changes in the position and state of the electrode plates, thereby affecting the accuracy of the battery inspection result.

In view of the above considerations, to improve the detection accuracy and detection efficiency of internal defects in batteries, this application provides a battery inspection apparatus including a bearing assembly, a pulsed ray source, a detector, and a first drive assembly. The bearing assembly is configured to bear a battery under test and drive the battery under test to move along a first direction. The detector is disposed opposite the pulsed ray source, where the two are located on two sides of the bearing assembly, respectively, and the detector receives a detection ray emitted by the pulsed ray source and penetrating a to-be-inspected region of the battery under test. The first drive assembly is connected to both the pulsed ray source and the detector, and the first drive assembly is configured to drive the pulsed ray source and the detector to rotate along a circumferential direction of a first rotation axis to acquire detected images of the to-be-inspected region.

Through the synergistic cooperation of the bearing assembly, the pulsed ray source, and the first drive assembly, rapid multi-angle imaging can be achieved for automatically transferred batteries to enable three-dimensional reconstruction, improving detection precision while reducing detection time, enhancing battery detection efficiency, adapting to the production takt of batteries, and achieving online detection.

The battery inspection apparatus and battery production device disclosed in the embodiments of this application can be used in the battery manufacturing process, and the detected or produced battery cells can be, but are not limited to, used in electric apparatuses such as vehicles, ships, or aircraft. The battery cell, battery, and the like disclosed in this application may be used to constitute a power source system of that electric apparatus.

An embodiment of this application provides an electric apparatus using a battery as a power source, where the electric apparatus may include, but is not limited to, a mobile phone, a tablet, a laptop, an electric toy, an electric tool, an electric bicycle, an electric vehicle, a ship, a spacecraft, and the like. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For convenience of description, the following embodiments take an electric apparatus in an embodiment of this application as a vehicle 1000 as an example for description.

Refer to FIG. 1. FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. A battery 100 is disposed inside the vehicle 1000, and the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, the controller 200 being configured to control the battery 100 to supply power to the motor 300, for example, for the operational power requirements during the start, navigation, and driving of the vehicle 1000.

In some embodiments of this application, the battery 100 can be used not only as the operational power source for the vehicle 1000 but also as a driving power source for the vehicle 1000, replacing or partially replacing fossil fuel or natural gas to provide driving traction for the vehicle 1000.

Figure 2:
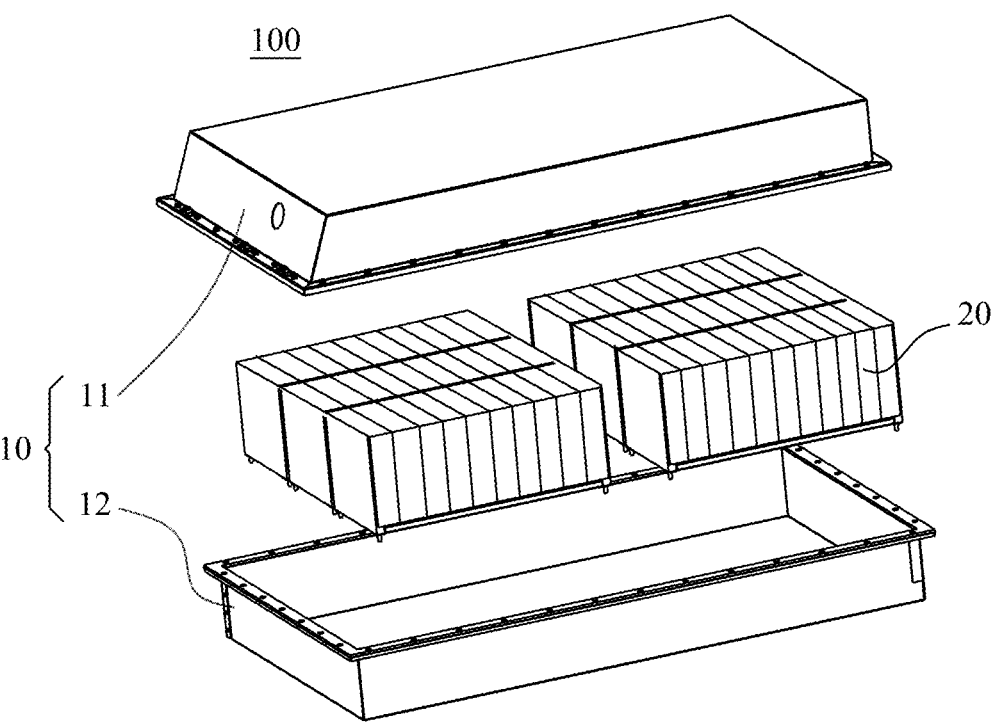
FIG. 2 is a schematic structural exploded view of a battery according to some embodiments of this application.

Referring to FIG. 2, FIG. 2 is a schematic structural exploded view of a battery 100 according to some embodiments of this application. The battery 100 includes a box 10 and a battery cell 20, where the battery cell 20 is accommodated in the box 10. The box 10 is configured to provide an accommodating space for the battery cell 20. The box 10 may have various structures. In some embodiments, the box 10 may include a first portion 11 and a second portion 12, the first portion 11 and the second portion 12 covering each other, the first portion 11 and the second portion 12 jointly defining an accommodating space for accommodating the battery cell 20. The second portion 12 may be a hollow structure with an opening at one end, and the first portion 11 may be a plate-like structure, the first portion 11 covering the opening side of the second portion 12, so that the first portion 11 and the second portion 12 jointly define the accommodating space. The first portion 11 and the second portion 12 may also both be hollow structures with an opening on one side, the opening side of the first portion 11 covering the opening side of the second portion 12. Certainly, the box 10 formed by the first portion 11 and the second portion 12 may have various shapes, such as a cylinder, a cuboid, and the like.

In the battery 100, a plurality of battery cells 20 are present, and the plurality of battery cells 20 may be connected in series, parallel, or series-parallel, where series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed in a manner that a plurality of battery cells 20 are connected in series, parallel, or series-parallel first to form a battery module, and then a plurality of battery modules are connected in series, parallel, or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery or a primary battery, or may be a lithium-sulfur battery, a sodium-ion battery, or a magnesium-ion battery, but is not limited thereto. The battery cell 20 may be cylindrical, flat, cuboid, or of other shapes.

Figure 3:
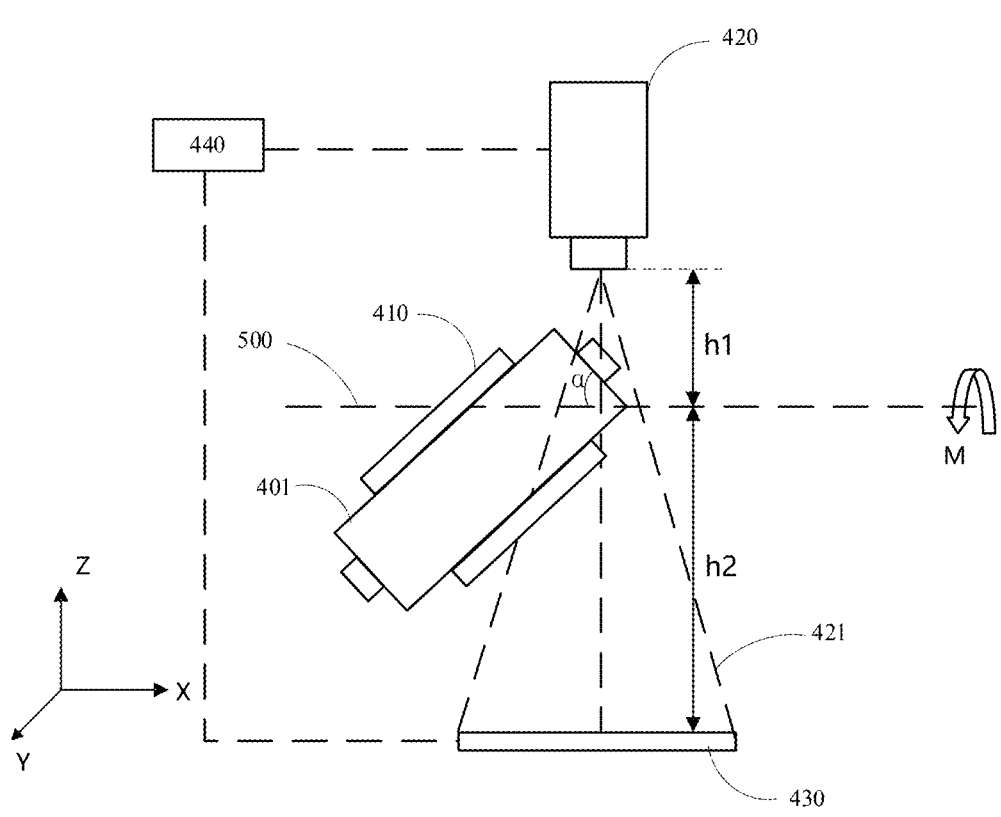
FIG. 3 is a schematic structural diagram of a battery inspection apparatus according to some embodiments of this application.
Figure 4:
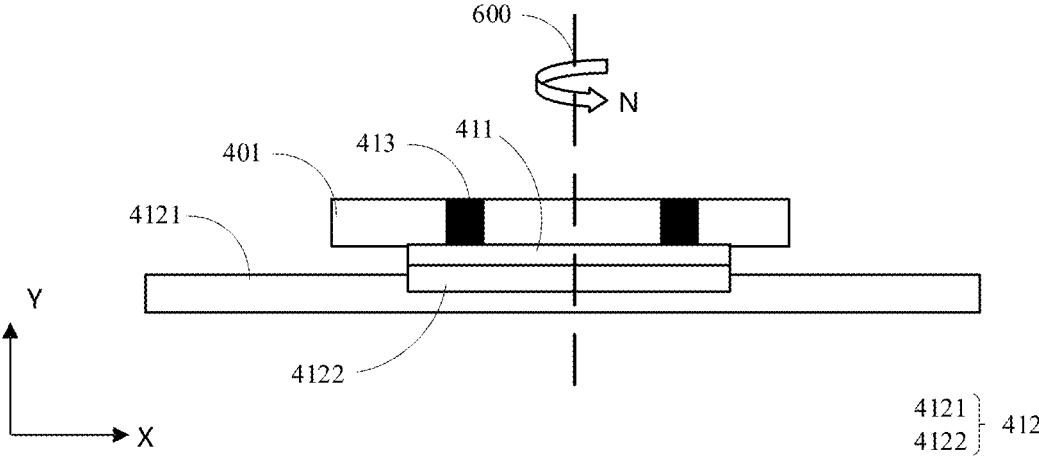
FIG. 4 is a schematic structural diagram of a bearing assembly bearing a battery under test according to some embodiments of this application.
Figure 5:
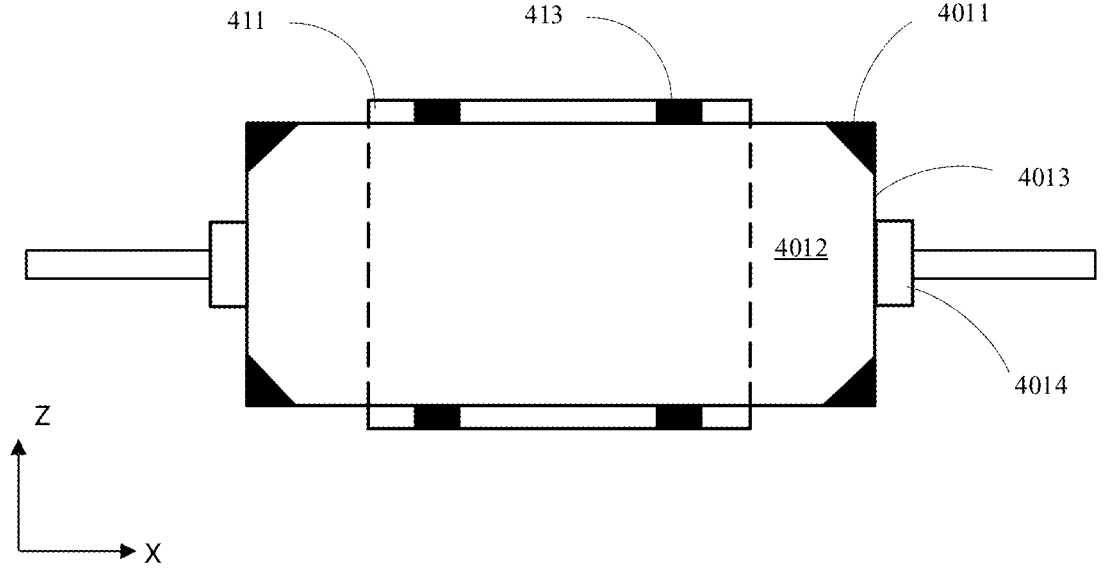
FIG. 5 is a top view of FIG. 4.

Referring to FIGS. 3-5, FIG. 3 is a schematic structural diagram of a battery inspection apparatus 400 according to some embodiments of this application. FIG. 4 is a schematic structural diagram of a bearing assembly 410 bearing a battery under test 401 according to some embodiments of this application. FIG. 5 is a top view of FIG. 4.

An embodiment of this application provides a battery inspection apparatus 400 including a bearing assembly 410, a pulsed ray source 420, a detector 430, and a first drive assembly 440. The battery inspection apparatus 400 is configured to detect a battery under test 401. The bearing assembly 410 is configured to bear the battery under test 401 and drive the battery under test 401 to move along a first direction X. The pulsed ray source 420 is configured to emit a detection ray 421 in a pulsed manner toward a to-be-inspected region 4011 of the battery under test 401 on the bearing assembly 410. The detector 430 is disposed opposite the pulsed ray source 420, where the two are located on two sides of the bearing assembly 410, respectively, and the detector 430 receives the detection ray emitted by the pulsed ray source 420 and penetrating the to-be-inspected region of the battery under test 401. The first drive assembly 440 is connected to both the pulsed ray source 420 and the detector 430. The first drive assembly 440 is configured to drive the pulsed ray source 420 and the detector 430 to rotate along a circumferential direction M of a first rotation axis 500 to acquire detected images of the to-be-inspected region.

The first rotation axis 500 is located between the pulsed ray source 420 and the detector 430 and is parallel to the first direction X.

The battery under test 401 may be the battery cell 20 after being placed into a housing as described in the above embodiments, or it may be a jelly roll that has not yet been placed into a housing. The battery under test 401 may be a laminated battery formed by stacking electrode plates or a wound battery formed by stacking and winding electrode plates. The to-be-inspected region 4011 may be any region of the battery under test 401, for example, it may be a partial region of the battery under test 401 or the entire region of the battery under test 401, and can be specifically selected based on the detection purpose.

The bearing assembly 410 is configured to bear the battery under test 401, specifically by supporting or clamping to achieve the purpose of bearing the battery under test 401. The bearing assembly 410 can move along the first direction X, thereby driving the battery under test 401 to move along the first direction X, so that the to-be-inspected region of the battery under test 401 moves into and out of the detection range between the pulsed ray source 420 and the detector 430.

The pulsed ray source 420 is a device capable of emitting detection ray in a pulsed manner, mainly including a ray tube and a corresponding power source. The detection ray 421 may be X-rays or other rays, and the ray tube can emit a corresponding detection ray 421, such as an X-ray or a γ-ray. The pulsed ray source 420 may be open-type (open tube) or closed-type (closed tube). In one example, the pulsed ray source 420 is an X-ray source, and the detection ray 421 emitted thereby is an X-ray. When the detection ray 421 emitted by the pulsed ray source 420 passes through the battery under test 401, due to differences in materials of the cathode and anode electrode plates inside the battery under test 401 (the anode surface is carbon powder, with weak ray absorption; and the cathode surface is a lithium-ion material, with strong ray absorption), different materials have different absorption rates for X-rays, and there is a gap between the cathode and anode electrode plates during winding. Therefore, the cathode-anode electrode plate spacing and cathode-anode electrode plate misalignment can be detected based on their different absorption levels of X-rays. The pulsed ray source 420 can control the emission of detection ray 421 based on a set pulse signal, and pulsed scanning can reduce the continuous operating time of the detector 430, thereby extending the service life of the detector 430.

The detector 430 may be a two-dimensional flat-panel detector, and the detector 430 may be an indirect flat-panel detector. In some examples, the detector 430 may include a photoelectric conversion layer and a scintillator layer sequentially stacked on a substrate, the scintillator layer being located on a side surface facing towards the pulsed ray source 420, so as to receive the detection ray 421 penetrating the battery under test 401 and generate visible photons. The photoelectric conversion layer receives the visible light emitted by the scintillator layer to generate corresponding electrical signals, thereby generating detected images of the to-be-inspected region.

The first drive assembly 440 is connected to both the pulsed ray source 420 and the detector 430, and drives the pulsed ray source 420 and the detector 430 to rotate along the circumferential direction M of the first rotation axis 500. As shown in FIG. 4, the first drive assembly 440 drives the pulsed ray source 420 and the detector 430 to rotate around the first rotation axis 500, the first rotation axis 500 being parallel to the first direction X, and the to-be-inspected region 4011 of the battery under test 401 is also located on the first rotation axis 500. The first direction X, the second direction Y, and the third direction Z are pairwise perpendicular. Along the third direction Z, the distance between the first rotation axis 500 and the pulsed ray source 420 is h1, and the distance between the first rotation axis 500 and the detector 430 is h2. The magnification of the detector is (h1+h2)/h1. By adjusting the positions of the pulsed ray source 420, the first rotation axis 500, and the detector 430 along the third direction Z, the magnification of the detector can be adjusted to meet the requirements of detection resolution.

In one example, the bearing assembly 410 bearing the battery under test 401 also moves along a direction parallel to the first rotation axis 500, so that the pulsed ray source 420 and the detector 430 rotate around the to-be-inspected region 4011 of the battery under test 401. It can be understood that during detection, it is sufficient for the pulsed ray source 420 and the detector 430 to rotate relative to the battery under test 401. In this embodiment, the pulsed ray source 420 and the detector 430 are configured to be rotatable, so that the battery under test 401 can remain stationary during detection, thereby avoiding changes in the position of the electrode plates inside the battery under test 401 due to rotational movement, which could affect the accuracy of the inspection results. In some examples, the first drive assembly 440 may be driven by a servo motor and connected to the pulsed ray source 420 and the detector 430 via a transmission mechanism to achieve precise control of the rotational movement of the pulsed ray source 420 and the detector 430.

The pulsed detection ray 421 emitted by the pulsed ray source 420 is synchronized with the rotational movement of the pulsed ray source 420 and the detector 430. By cooperatively controlling the pulse signal frequency of the detection ray 421 and the rotational speed of the pulsed ray source 420 and the detector 430, after the pulsed ray source 420 and the detector 430 rotate to the designated position, the pulse signal is sent to the ray tube, so that the detection ray 421 can be emitted toward the to-be-inspected region 4011 of the battery under test 401 at different positions and different incident angles. After penetrating the to-be-inspected region 4011, the rays are received by the detector 430 and form corresponding electrical signals, ultimately obtaining a plurality of detected images of the to-be-inspected region taken from different angles for three-dimensional reconstruction, for example, using a filtered back-projection algorithm for reconstruction. This method can effectively remove shape artifacts, is fast, and provides good reconstruction quality. During three-dimensional reconstruction, only the region of interest, that is, the corner slice region where the preset to-be-inspected region 4011 is located, can be reconstructed, thereby efficiently and quickly obtaining the target slice image.

With the bearing assembly 410, the pulsed ray source 420, and the first drive assembly 440 provided, ray detection can be performed on the to-be-inspected region 4011 of the battery under test 401 in a pulsed scanning manner at different positions and different angles to obtain detected images for three-dimensional reconstruction, thereby improving the accuracy of image detection. The cooperation of the pulsed ray source 420, the bearing assembly 410, and the first drive assembly 440 can enable online detection, which can be synchronized with the production takt of batteries, thereby improving detection efficiency.

According to some embodiments of this application, the bearing assembly 410 includes a tray 411 and a second drive assembly 412. The tray 411 is configured to bear one or more batteries under test 401; and the second drive assembly 412 is connected to the tray 411, where the second drive assembly 412 includes a translation unit 4121, and the translation unit 4121 is configured to drive the tray 411 to translate along the first direction X.

The tray 411 is a disc-shaped structural member for holding the battery under test 401. The shape of the tray 411 may match the shape of the battery under test 401. For example, it may be a rectangular flat plate. The tray 411 may hold one battery under test 401, or a plurality of batteries under test 401 may be stacked on the tray. The second drive assembly 412 may be any drive assembly to achieve the purpose of driving the tray 411 and the battery under test 401 to move. The translation unit 4121 may be any linear drive unit capable of driving the tray 411 and the battery under test 401 on the tray 411 to move linearly in a specific direction. In some examples, the second drive assembly 412 may be a magnetic drive unit, for example, including a magnetic levitation track and a magnetic drive base, the magnetic drive base moving along an extension direction of the magnetic levitation track in a manner of magnetic drive. The tray 411 may be fixedly disposed on the magnetic drive base to translate along the first direction X under magnetic force. It can be understood that the second drive assembly 412 may alternatively be other drive structures, such as a screw drive or a motor drive, which are not specifically described in this embodiment.

With the second drive assembly 412 provided to drive the tray 411 to translate, the battery under test 401 can be automatically moved into and out of the ray range between the pulsed ray source 420 and the detector 430, thereby enabling automatic transfer and detection of the battery under test 401, adapting to the battery production rhythm, and improving detection efficiency.

According to some embodiments of this application, the second drive assembly 412 further includes a rotation unit 4122, where the rotation unit 4122 is configured to drive the tray 411 to rotate along a circumferential direction N of a second rotation axis 600, and the second rotation axis 600 is a direction from the tray 411 surface toward the battery under test 401 and perpendicular to the first direction X.

The rotation unit 4122 may be a rotating structure directly driven by a power component, such as a servo motor drive or a magnetic levitation drive, or may convert linear motion into rotational motion through a transmission mechanism to make the tray 411 rotate along the circumferential direction N of the second rotation axis 600. The second rotation axis 600 is a direction from a surface of the tray 411 toward the battery under test 401 and is perpendicular to the first direction X. In some examples, the second rotation axis 600 passes through the center of the tray 411 and is parallel to the second direction Y, the second direction Y being perpendicular to the first direction X. In some examples, the battery under test 401 is disposed directly above the surface of the tray 411, the second direction Y is a vertically upward direction of the second rotation axis 600, and the tray 411 rotates around the vertical direction, thereby driving the battery under test 401 to rotate with the second rotation axis 600 as an axis. When there are a plurality of to-be-inspected regions 4011, for example, when the to-be-inspected regions 4011 include the four corners of the battery under test 401, this can allow each corner to be sequentially rotated and moved to between the pulsed ray source 420 and the detector 430 for detection. When images are acquired for the second corner, three-dimensional reconstruction processing is performed on the detected images acquired for the previous corner, thereby improving detection efficiency.

With the rotation unit 4122 provided to drive the tray 411 to rotate, the battery under test 401 can be driven to rotate, thereby adjusting the portion of the battery under test 401 located within the ray range between the pulsed ray source 420 and the detector 430, achieving detection of a plurality of to-be-inspected regions, improving detection efficiency, and enabling more accurate acquisition of detected images of specific to-be-inspected regions 4011 in the battery under test 401, thereby improving detection accuracy.

According to some embodiments of this application, the battery under test 401 includes two first surfaces 4012 disposed opposite each other and first side surfaces 4013 connected to the two first surfaces 4012, respectively, the first side surface 4013 being a side surface at which a tab 4014 of the battery under test 401 is located, and the second direction Y being perpendicular to the first surface 4012. The rotation unit 4122 is configured to drive the tray 411 to rotate such that a projection of the first surface 4012 on the tray 411 surface forms a first included angle $\alpha$ with the first direction X, satisfying $0 < \alpha < 90°$.

As shown in FIGS. 3-5, the battery under test 401 may be a battery cell after being encased, the first surface 4012 being the surface of the housing directly facing towards the large surface of the electrode plate of the battery under test 401, and the first side surface 4013 being the surface of the housing on the side where the tab of the battery under test 401 is located. The battery under test 401 may also be a jelly roll, the corresponding first surface 4012 being the surface at which the large surface of the electrode plate is located, and the first side surface 4013 being the side surface of the jelly roll where the tab is formed by the foil extending from the end of the electrode plate not coated with active material. In one example, the battery under test 401 is placed on the upper surface of the tray 411, the to-be-inspected region 4011 is located at a corner of the battery under test 401, the first surface 4012 is parallel to the upper surface of the tray, the first side surface 4013 is perpendicular to the upper surface of the tray 411, and the first side surface 4013 is parallel to the second direction Y. The rotation unit 4122 drives the tray 411 to rotate around the second rotation axis 600, so that the projection of the first side surface 4013 on the tray forms a first included angle α with the first direction X to meet the requirements of the ray incident angle. When the to-be-inspected regions 4011 are a plurality of regions, the different to-be-inspected regions 4011 can be sequentially moved through the rotation unit 4122 into the ray range for detection.

Since the ray detection of the battery under test 401 mainly involves acquiring detected images of the corners of the battery under test 401 to obtain parameters such as the cathode-anode electrode plate misalignment and electrode plate spacing through detection, thereby determining whether the quality of the battery under test 401 meets quality requirements. With the rotation unit provided, the position of the battery under test 401 can be adjusted so that the first side surface 4013 of the battery under test 401 can be positioned at an appropriate angle within the detection region between the pulsed ray source 420 and the detector 430, thereby adjusting the incident angle of the rays and switching between a plurality of to-be-inspected regions 4011, which helps to improve the quality of the acquired images of the battery under test 401 and enhancing detection efficiency.

According to some embodiments of this application, the first included angle α satisfies $20° \leq α \leq 45°$.

Both the first included angle α being too large and being too small lead to the inclusion of excessive information of uninteresting regions in the acquired detected images of the battery under test 401, thereby affecting the accuracy of image recognition. Specifically limiting the first included angle α to between 20° and 45° can effectively acquire detected images of the to-be-inspected region 4011 of interest, improving imaging quality. In some examples, the first included angle may be 45°.

Limiting the value of the first included angle to an appropriate range can improve the imaging quality of the to-be-inspected region, facilitating an increase in the accuracy of subsequent image recognition and thereby enhancing the accuracy of defect detection for the battery under test 401.

Figure 6:
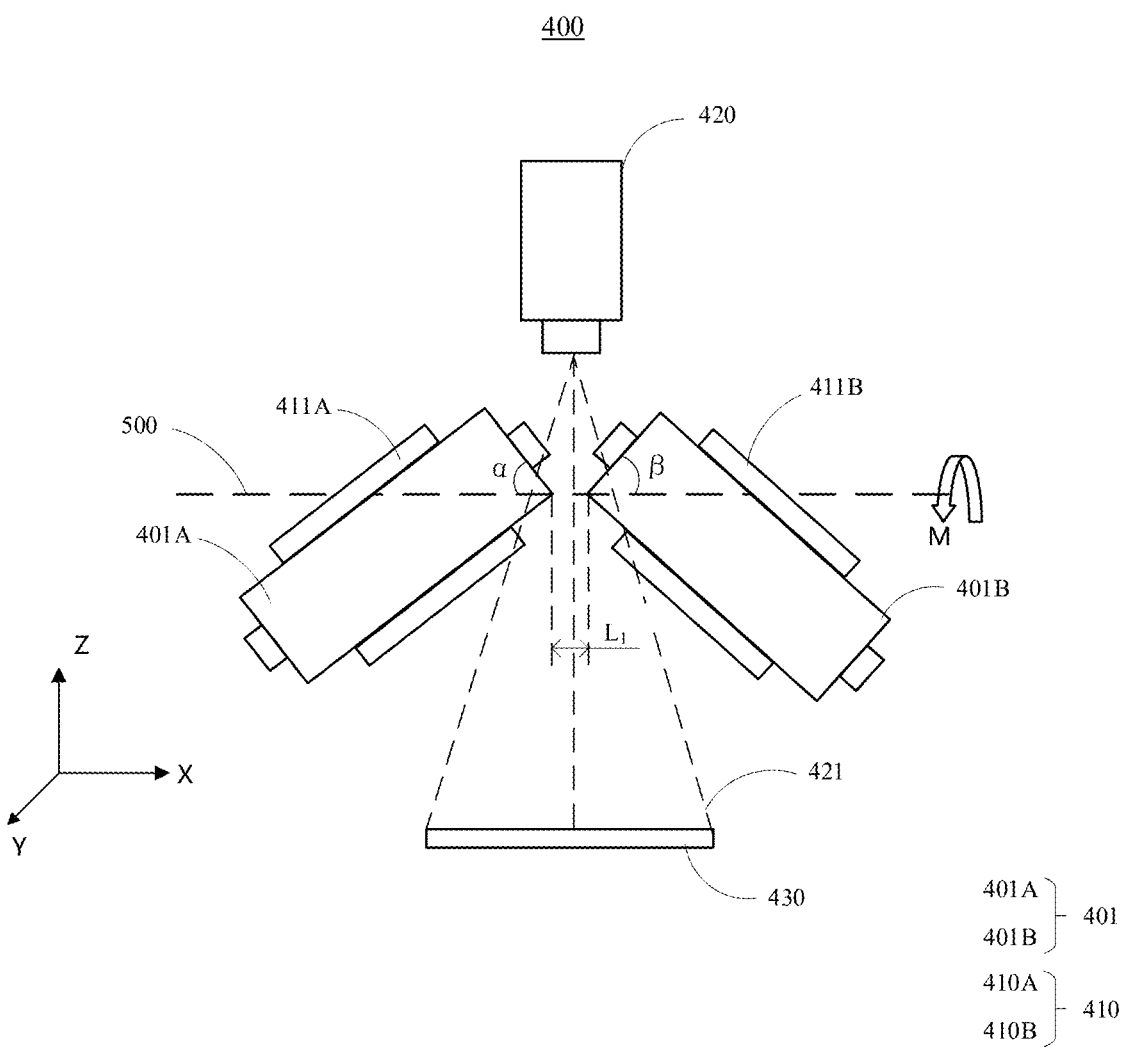
FIG. 6 is a schematic structural diagram of a battery inspection apparatus according to some other embodiments of this application.

Referring to FIG. 6, FIG. 6 is a schematic structural diagram of a battery inspection apparatus according to some other embodiments of this application.

According to some embodiments of this application, the bearing assembly 410 includes a plurality of trays 411 spaced along the first direction X, the translation unit 4121 drives the plurality of trays 411 to translate such that to-be-inspected regions 4011 of batteries under test 401 on two adjacent trays 411 are both located within the ray range between the pulsed ray source 420 and the detector 430, and the to-be-inspected region 4011 is located at a corner of the battery under test 401.

The corner of the battery under test 401 refers to the region where the four corners of the first surface 4012 of the battery under test 401 are located. For laminated batteries and wound batteries, the corners of the battery under test 401 can effectively present the position information of the cathode and anode electrode plates, facilitating the determining of defects between the electrode plates, such as the cathode-anode electrode plate misalignment and electrode plate spacing. As shown in FIG. 6, the plurality of trays 411 includes an adjacent first tray 411A and a second tray 411B, a first battery under test 401A being placed on the first tray 411A, and a second battery under test 401B being placed on the second tray 411B. During detection, the second drive assembly 412 translates the first tray 411A and the second tray 411B to a preset position and rotates them by a preset angle, so that one corner of the first battery under test 401A and one corner of the second battery under test 401B are both located within the ray range between the pulsed ray source 420 and the detector 430, enabling simultaneous detection of batteries under test on adjacent trays. In some embodiments, a plurality of batteries under test 401 may be stacked on any one tray 411, so that one rotation of the pulsed ray source 420 and the detector 430 can achieve detection of more batteries under test 401. In one example, the first side surface of the first battery under test 401A forms a first included angle α with the first direction X, and the first side surface of the second battery under test 401B on the adjacent tray forms a first included angle β with the first direction X, where $α=β=45°$.

With the plurality of trays 411 provided and the movement of the trays 411 controlled by the second drive assembly 412, synchronous detection of a plurality of batteries under test 401 can be achieved, improving battery detection efficiency.

According to some embodiments of this application, the translation unit 4121 is configured to make a minimum spacing $L_1$ between the batteries under test 401 on the two adjacent trays 411 along the first direction X satisfy: $0 < L_1 \leq 2$ mm.

The minimum spacing $L_1$ refers to the minimum distance along the first direction X between the outer contours of the projections of the batteries under test 401 on two adjacent trays 411 on the tray 411. It can be understood that when the tray 411 can drive the battery under test 401 to rotate, the minimum spacing $L_1$ refers to the minimum distance along the first direction X between the outer contours of the projections of two adjacent batteries under test 401 on the tray 411 during rotation. If the minimum spacing $L_1$ is equal to 0, it may cause interference between two adjacent batteries under test 401. If the minimum spacing $L_1$ is too large, it may lead to an excessive gap between two adjacent batteries under test 401, causing some of the detection ray 421 to be received directly by the detector 430 without passing through the battery under test 401, resulting in waste.

With the movement of the trays 411 controlled through the translation unit 4121, the batteries under test 401 on the adjacent trays 411 can maintain a reasonable distance, enabling improved detection efficiency while reducing waste of rays.

According to some embodiments of this application, a ray absorption rate of the tray 411 for the detection ray 421 is less than a minimum ray absorption rate of the battery under test 401 for the detection ray 421.

When the detection ray 421 penetrates a material, some are absorbed, causing ray attenuation. A ray absorption rate refers to a degree of absorption of rays per unit thickness of a certain material. The battery under test 401 contains various materials, and different materials have different absorption levels for the detection ray and correspondingly have different ray absorption rates. The detector 430 can present positional information of different materials in the battery under test 401 from the received detection ray 421 based on this principle. A minimum ray absorption rate of the battery under test 401 for the detection ray 421 refers to a ray absorption rate corresponding to a material in the battery under test 401 with a lowest absorption rate for the detection ray 421 when the detection ray 421 penetrate the battery under test 401.

The ray absorption rate of the tray 411 for the detection ray 421 is mainly related to its material, with different materials having different ray absorption rates for the detection ray 421. Since the tray 411 is located behind the battery under test 401 in the ray path, the detection ray 421 penetrating the battery under test 401 often needs to penetrate the tray 411 as well. With an appropriate material selected, the ray absorption rate of the tray 411 for the detection ray 421 can be made less than the minimum ray absorption rate of the battery under test 401 for the detection ray 421.

With the ray absorption rate of the tray 411 set to be less than the minimum ray absorption rate of the battery under test 401 for the detection ray 421, the influence of the tray 411 on the detection ray 421 can be reduced, or the tray 411 can be more easily distinguished from the battery under test 401 in the detected images, thereby reducing the impact of the tray 411 on the inspection results in the detected images and improving the accuracy of the inspection results.

According to some embodiments of this application, a material of the tray 411 includes carbon fiber.

Carbon fiber is highly permeable to X-rays, with an X-ray absorption rate per unit (unit) thickness of only 1.4%/mm, far less than that of metal materials such as aluminum. The tray 411 may be entirely or partially made of carbon fiber or may be made of a carbon fiber composite material to balance other performance aspects.

The inclusion of carbon fiber in the material of the tray 411 can reduce the absorption of detection ray by the tray 411, thereby mitigating adverse effects of the tray 411 on inspection results, reducing the processing load for subsequent image recognition, and improving detection accuracy.

According to some embodiments of this application, the tray 411 includes a protective layer on a side surface facing towards the battery under test 401, and a surface roughness of the protective layer is less than a preset threshold.

The protective layer may be obtained by processing the side surface of the tray 411 facing towards the battery under test, for example, by polishing the side surface of the tray 411 facing towards the battery under test to make the surface roughness of that surface less than a preset threshold to meet roughness requirements. The protective layer may alternatively be formed by applying an additional layer of material to the side surface of the tray 411 facing towards the battery under test so as to form a film layer, such as spraying or adhering a Teflon material layer, to form a protective layer with a surface roughness less than the preset threshold. The preset threshold can be selected based on actual needs. For example, it may be a surface roughness of a non-protective layer location, that is, the surface roughness of the protective layer is less than that of the non-protective layer location. Other suitable thresholds may also be selected as needed to meet the protection requirements for the battery.

With the protective layer provided on the side surface of the tray 411 facing towards the battery under test 401, wear on the battery under test 401 by the tray 411 can be reduced, thereby more effectively mitigating damage to the battery under test 401 during the detection process.

According to some embodiments of this application, the bearing assembly 410 further includes a plurality of stoppers 413 movably connected to the tray 411 and spaced apart, and the plurality of stoppers 413 are configured to clamp the battery under test 401.

The stoppers 413 may be movably connected to the side surface of the tray 411 facing towards the battery under test 401. For example, a groove is provided and the stoppers 413 are movably inserted into the groove to achieve a movable connection. This allows the battery under test 401 to be clamped between the plurality of stoppers 413, thereby fixing the battery under test 401 to facilitate moving or rotating the battery under test 401. In some examples, the distance between the plurality of stoppers 413 may be set to be adjustable to accommodate batteries under test 401 of different sizes. A spacing between two stoppers 413 located on opposite sides of the battery under test 401 is set to be larger than the corresponding dimension of the battery under test 401 to prevent damage to the battery under test during clamping. It can be understood that an elastic buffer member may be provided on a side of the stopper 413 facing towards the battery under test 401 to fill a gap between the stopper 413 and the battery under test 401 and protect the battery under test 401.

With the plurality of movably connected stoppers 413 provided, the clamping needs of batteries under test 401 of different sizes can be accommodated, and the battery under test 401 can be fixed more conveniently, thereby expanding the application range of the battery inspection apparatus 400.

Figures 7, 8:
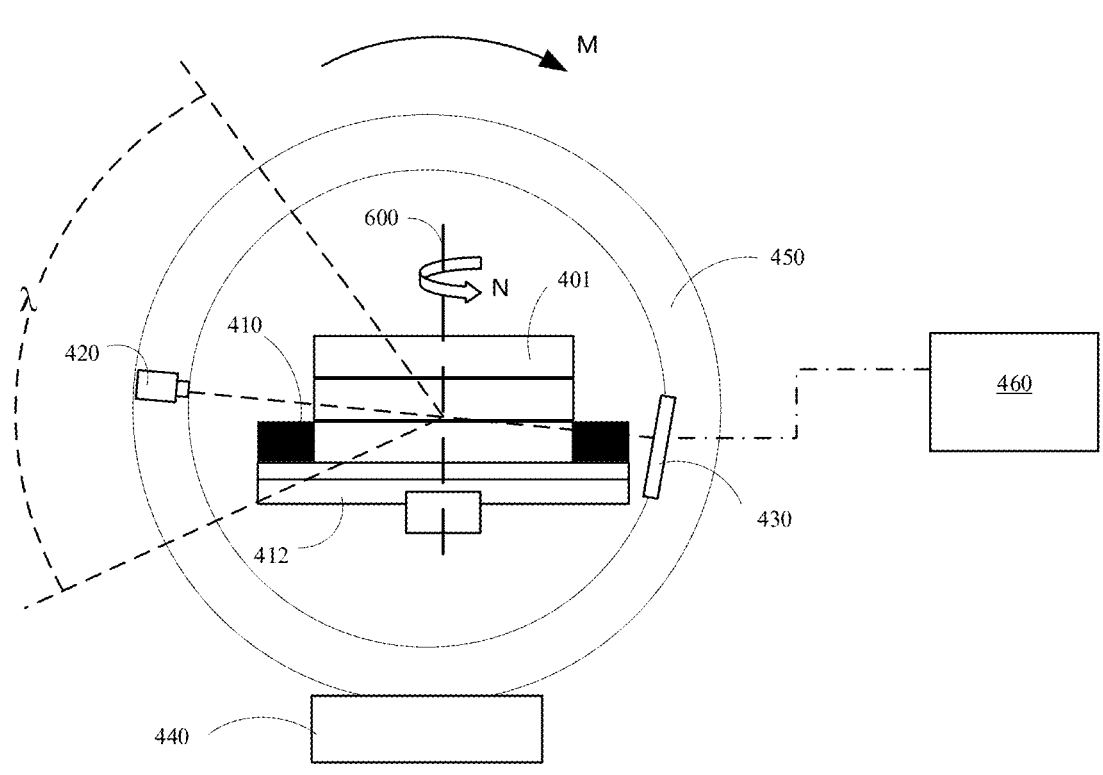
FIG. 7 is a schematic structural diagram of a battery inspection apparatus according to yet some other embodiments of this application.
FIG. 8 is a structural block diagram of a battery production device according to some embodiments of this application.

Referring to FIG. 7, FIG. 7 is a schematic structural diagram of a battery inspection apparatus 400 according to some embodiments of this application.

According to some embodiments of this application, the battery inspection apparatus 400 further includes a rotary table 450, the pulsed ray source 420 and the detector 430 are fixedly connected to the rotary table 450, and the first drive assembly 440 drives the rotary table 450 to rotate along the circumferential direction M of the first rotation axis 500.

The rotary table 450 may have any shape with a hollow center, such as a circular ring, to allow the second drive assembly 412 to drive the tray 411 and the battery under test 401 to pass through the center. The pulsed ray source 420 and the detector 430 are simultaneously fixedly connected to the rotary table 450 with their relative positions fixed, so that the first drive assembly 440 does not need to adjust the positions of the pulsed ray source 420 and the detector 430 when driving the rotary table 450 to move. The first drive assembly 440 may be a servo motor, directly or indirectly driving the rotary table 450 to perform rotational motion, or it may be another type of power component.

With a rotary table for fixing the pulsed ray source 420 and the detector 430 provided, the positional stability of the pulsed ray source 420 and the detector 430 can be maintained during detection, saving time for repositioning and improving detection efficiency and detection accuracy.

According to some embodiments of this application, a maximum rotation angle λ along a circumferential direction of the pulsed ray source 420 and the detector 430 along the circumferential direction M of the first rotation axis 500 satisfies 45°≤λ≤180°.

The first drive assembly 440 can drive the pulsed ray source 420 and the detector 430 to rotate along the circumferential direction M of the first rotation axis 500 within a certain angle range, and the maximum angle λ refers to the maximum value of this rotatable angle range. The value of the maximum angle λ can be set based on detection requirements. A smaller maximum angle λ means a smaller rotatable angle range for the pulsed ray source 420 and the detector 430 along the circumferential direction M of the first rotation axis 500. For thicker batteries under test or more batteries under test, this may cause some to-be-inspected regions to be outside the detection range and thus undetectable. A larger maximum angle λ allows a larger rotatable angle range but also consumes more detection time, which is not conducive to improving detection efficiency. In some examples, the maximum rotation angle λ of the pulsed ray source 420 and the detector 430 may be 90°, for example, rotating from −45° to 45° (with a plane where the first surface 4012 of the battery under test 401 is located as a reference plane, included angles formed below the reference plane being negative, and included angles formed above the reference plane being positive).

In this embodiment, limiting the maximum rotation angle of the pulsed ray source 420 and the detector 430 to an appropriate range can balance the image quality of detection imaging and detection efficiency, better adapting to the production takt of batteries.

According to some embodiments of this application, the detector is a complementary metal-oxide-semiconductor (Complementary Metal-Oxide Semiconductor, CMOS) detector.

In this embodiment, the photodiode array of the CMOS detector is made of crystalline silicon using a CMOS process. The CMOS detector has an amplifier next to each pixel, which can amplify a signal before transmission, resulting in a high signal level relative to noise, that is, a high signal-to-noise ratio, and higher quantum detection efficiency under the same ray dosage. Additionally, due to its active pixels, the CMOS detector has the advantages of strong transmitted signals and fast reading speeds.

Using the CMOS detector can allow for better cooperation with the pulsed ray source, achieving fast imaging while maintaining imaging quality, thereby improving the detection efficiency of the battery under test 401.

According to some embodiments of this application, a maximum size of the focus of the pulsed ray source 420 is less than or equal to 80 microns.

The focus size of the ray source refers to a size of the focus along a direction parallel to a plane where the focus is located. Under the same conditions, a smaller focus results in higher resolution and better imaging quality. Common methods for measuring the focus size of a ray source include direct and indirect methods. The direct method involves directly observing the shape and size of the focus, such as the pinhole method. The indirect method involves observing a point spread function or line spread function caused by the focus size to calculate the focus size, including the edge method, slit method, and ball target method. Detection can alternatively be performed according to methods specified in relevant measurement standards, such as the measurement methods listed in GB/T26834-2011.

The magnitude of the focus size is directly related to the image resolution of the battery inspection apparatus. Specifically limiting the focus diameter size can better match the detection precision of the battery inspection apparatus with the dimensions of the battery under test, thereby improving detection accuracy and detection efficiency.

According to some embodiments of this application, the battery inspection apparatus 400 further includes an image processing unit 460, where the image processing unit 460 is in signal connection with the detector 430 to identify detected images acquired by the detector 430.

The image processing unit 460 may be a computer device, and the image processing unit 460 restores the image of the tested object by receiving electrical signals from the detector 430. The image processing unit 460 may also preset corresponding image recognition algorithms to obtain corresponding inspection results by identifying the detected images and determine whether the battery under test 401 has abnormalities based on the inspection results. In one example, the image processing unit 460 can identify the detected images to obtain parameters such as the cathode-anode electrode plate misalignment and/or cathode-anode electrode plate spacing inside the battery under test 401, compare the above parameters with preset thresholds, and output corresponding inspection results based on the comparison results.

With the image processing unit 460 provided to receive an image signal generated by the detector 430 and identify the detected images to output an inspection result of the battery under test 401, automatic detection of an internal defect in the battery under test can be achieved, improving the automation level and detection efficiency of the battery inspection apparatus.

Referring to FIG. 8, FIG. 8 is a structural block diagram of a battery production device 700 according to some embodiments of this application.

This embodiment of this application provides the battery production device 700 including the battery inspection apparatus 400 according to the embodiments described above.

The battery production device 700 may be a device for producing jelly rolls or battery cells, or may be a device for producing battery packs or battery groups.

The battery production device 700 including the battery inspection apparatus 400 enables non-destructive testing of a battery under test 401 during the production process of the battery under test 401, so as to timely identify internal defects in the battery under test 401, thereby eliminating unqualified batteries under test 401 and improving the quality of batteries under test 401 that are released.

The battery inspection apparatus of this application is further described below in conjunction with one or more specific embodiments.

As shown in FIGS. 3-7, the battery inspection apparatus 400 includes a bearing assembly 410, a pulsed ray source 420, a detector 430, a first drive assembly 440, a rotary table 450, and an image processing unit 460. The battery inspection apparatus 400 is configured to detect a battery under test 401. The bearing assembly 410 is configured to bear the battery under test 401 and drive the battery under test 401 to move along a first direction X. The pulsed ray source 420 is configured to emit a detection ray 421 in a pulsed manner toward a to-be-inspected region 4011 of the battery under test 401 on the bearing assembly 410. The detector 430 is disposed opposite the pulsed ray source 420, where the two are located on two sides of the bearing assembly 410, respectively, and the detector 430 receives the detection ray emitted by the pulsed ray source 420 and penetrating the to-be-inspected region of the battery under test 401. The first drive assembly 440 is connected to both the pulsed ray source 420 and the detector 430, and the first drive assembly 440 is configured to drive the pulsed ray source 420 and the detector 430 to rotate along a circumferential direction M of a first rotation axis 500 to acquire detected images of the to-be-inspected region.

In some examples, the battery under test 401 may be a laminated battery, and the to-be-inspected region 4011 may be a corner of the battery under test 401.

In some examples, the bearing assembly 410 includes a tray 411, a second drive assembly 412, and a plurality of stoppers 413. The stoppers 413 are movably connected to the tray 411 and spaced apart, and the tray 411 is configured to bear one or more batteries under test 401. A material of the tray 411 is carbon fiber or a carbon fiber composite material. The plurality of stoppers 413 are configured to clamp the battery under test 401.

In some examples, the second drive assembly 412 is connected to the tray 411. The second drive assembly 412 includes a translation unit 4121 and a rotation unit 4122. The translation unit 4121 is configured to drive the tray 411 to translate along the first direction X, and the rotation unit 4122 is configured to drive the tray 411 to rotate along a circumferential direction N of a second rotation axis 600, so that a projection of a first side surface 4013 of the battery under test 401 on the tray 411 surface forms a first included angle α of 45° with the first direction X.

In some examples, the pulsed ray source 420 and the detector 430 are fixedly connected to the rotary table 450. The first drive assembly 440 drives the rotary table 450 to rotate along the circumferential direction M of the first rotation axis 500. A maximum rotation angle λ of the pulsed ray source 420 and the detector 430 along the circumferential direction M of the first rotation axis 500 satisfies 45°≤λ≤180°.

In some examples, the detector is a CMOS detector, and a maximum size of a focus of the pulsed ray source 420 is less than or equal to 80 microns.

In some examples, the image processing unit 460 is in signal connection with the detector 430 to identify detected images acquired by the detector 430.

Figure 9:
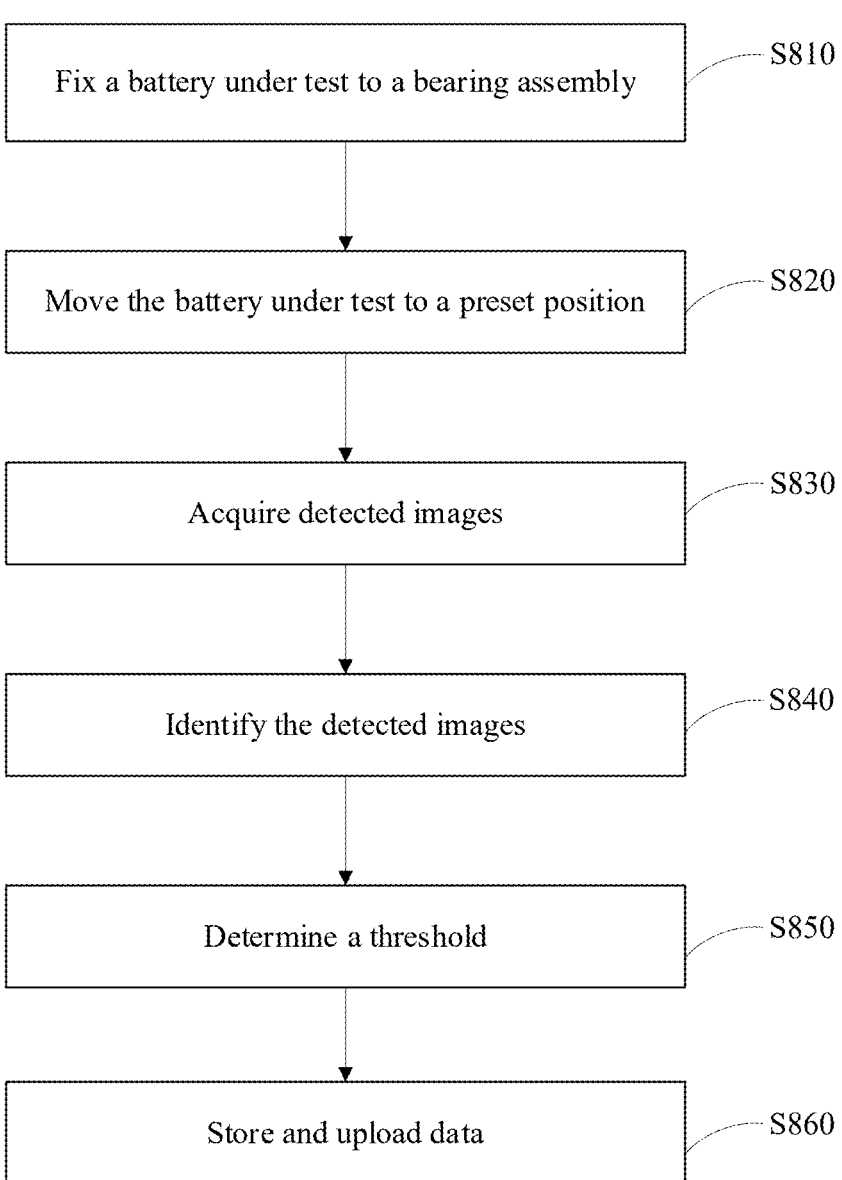
FIG. 9 is a flowchart of a battery inspection method according to some embodiments of this application.

Referring to FIG. 9, FIG. 9 is a flowchart of a battery defect inspection method 800 according to some embodiments of this application.

An embodiment of this application provides a battery defect inspection method 800, and the method 800 can be implemented by the battery inspection apparatus 400 according to the embodiments described above.

In some examples, the battery defect inspection method 800 may include the following steps:

Step S810: Fix a battery under test 401 to a bearing assembly 410. The battery under test 401 is clamped between a plurality of stoppers 413 by moving positions of the stoppers 413 on the bearing assembly 410.

Step S820: Move the battery under test 401 to a preset position. This step includes controlling a translation unit 4121 to drive the battery under test 401 to move to a designated position between the pulsed ray source 420 and the detector 430, and controlling a rotation unit 4122 to drive the battery under test 401 to rotate until a first side surface 4013 of the battery under test 401 forms an included angle of 45° with the first direction X.

Step S830: Acquire detected images. Control the pulsed ray source 420 and the detector 430 to perform rotational scanning to acquire a plurality of detected images of a to-be-inspected region 4011. The first drive assembly 440 drives the pulsed ray source 420 and the detector 430 to rotate around a first rotation axis 500, with a rotation angle from −45° to 45°. The acquisition frequency and number can be specifically set based on the number and thickness of the batteries under test 401. The ray source is controlled by a pulse signal to emit a detection ray, which are then received by the detector 430 to form detected images.

Step S840: Identify the detected images. This specifically includes:

Three-dimensional reconstruction: performing three-dimensional reconstruction on the detected images acquired in step S830 by using a filtered back-projection algorithm (FBP). This method can effectively remove shape artifacts, is fast, and provides good reconstruction quality, and only a region of interest, that is, a slice region of a preset corner, is reconstructed. This method can allow efficient and rapid acquisition of target slice images.

Image preprocessing: preprocessing the slice images obtained from three-dimensional reconstruction to facilitate subsequent algorithm-based point capture and line drawing recognition. The preprocessing step includes region of interest (region of interest, ROI) cropping and contrast enhancement. ROI cropping involves cropping the obtained slice image to remove surrounding areas with no information, thereby improving image processing efficiency and reducing image storage size. Contrast enhancement involves enhancing the grayscale contrast in the image to highlight the lines of cathode and anode electrode plates in the image.

Algorithm recognition: accurately capturing a vertex of the cathode and a vertex of the anode in the image and accurately drawing lines for the cathode and anode by using a deep learning model. First, collecting test images of some batteries under test 401, calibrating the preprocessed images to form a training dataset, using a deep learning model to train the calibrated images to accurately capture cathode and anode vertices and draw lines accurately, and then identifying the preprocessed detected images to obtain a cathode-anode misalignment and a cathode-anode spacing value.

Step S850: Threshold determining.

Threshold determining involves reading the coordinates of the cathode and anode vertices identified by the algorithm, calculating the difference between their vertical coordinates, and multiplying it by the actual size of the pixel obtained from calibration to obtain the cathode-anode misalignment. In addition, lines are drawn by reading the positions of the cathode and anode electrode plates identified by the algorithm, calculating the difference between their horizontal coordinates, and multiplying it by the actual size of the pixel obtained from calibration to obtain the cathode-anode spacing value. These are then compared with a preset cathode-anode misalignment threshold and a cathode-anode spacing value threshold. If any measured value is less than the preset threshold, it is determined as NG. Otherwise, it is determined as OK. In addition, the NG type is marked on the image, and the NG type may be cathode-anode electrode plate misalignment NG, cathode-anode electrode plate spacing value NG, or both NGs. In some examples, the determining threshold for the cathode-anode electrode plate misalignment is set at 0.1 mm, with products whose cathode-anode electrode plate misalignments are greater than 0.1 mm being determined as OK and those whose cathode-anode electrode plate misalignments are less than 0.1 mm being determined as NG. The determining threshold for the cathode-anode electrode plate spacing value is set at 120 microns (μm), with products whose cathode-anode electrode plate spacing values are greater than 120 μm being determined as NG and those whose cathode-anode electrode plate spacing values are less than 120 μm being determined as OK.

In some examples, after step S850, step S860 may further be performed: Store and upload data.

The cathode-anode electrode plate misalignments and cathode-anode electrode plate spacing values identified by the algorithm are automatically stored in a table for output, and NG images and data are uploaded to a cloud system for easy viewing and data traceability. The times for image test and table storage can be customized based on user needs.

Finally, it should be noted that the above embodiments are only used to illustrate the technical solutions of this application and are not intended to limit them. Although this application has been described in detail with reference to the foregoing embodiments, those of ordinary skill in the art should understand that they can still modify the technical solutions described in the foregoing embodiments or make equivalent substitutions for some or all of the technical features. Such modifications or substitutions do not cause the essence of the corresponding technical solutions to depart from the scope of the technical solutions of the embodiments of this application, and they should be encompassed within the scope of the claims and specification of this application. In particular, as long as there is no structural conflict, the technical features mentioned in the various embodiments can be combined in any manner. This application is not limited to the specific embodiments disclosed in this specification but includes all technical solutions falling within the scope of the claims.

The invention claimed is:

1. A battery inspection apparatus comprising:
a tray bearing assembly configured to bear a battery under test and drive the battery under test to move along a first direction;
a pulsed ray source configured to emit a detection ray in a pulsed manner toward a to-be-inspected region of the battery under test on the tray bearing assembly;
a detector disposed opposite the pulsed ray source, wherein the two are located on two sides of the tray bearing assembly, respectively, and the detector receives the rays emitted by the ray source and penetrating the to-be-inspected region of the battery under test; and
a first, motor driven, assembly connected to both the pulsed ray source and the detector, wherein the first-, motor driven, assembly is configured to drive the pulsed ray source and the detector to rotate along a circumferential direction of a first rotation axis to acquire detected images of the to-be-inspected region, wherein the first rotation axis is parallel to the first direction;
wherein a maximum rotation angle A along a circumferential direction of the pulsed ray source and the detector around the first rotation axis satisfies $45° \leq \lambda \leq 180°$.

2. The battery inspection apparatus according to claim 1, wherein the tray bearing assembly comprises:
a tray configured to bear one or more batteries under test; and
a second-, motor driven, assembly connected to the tray, wherein the, motor driven, assembly comprises a translation unit, wherein the translation unit is configured to drive the tray to translate along the first direction.

3. The battery inspection apparatus according to claim 2, wherein
the second, motor driven, assembly further comprises a rotation unit, wherein the rotation unit is configured to drive the tray to rotate along a circumferential direction of a second rotation axis, and the second rotation axis is a direction from a surface of the tray toward the battery under test and is perpendicular to the first direction.

4. The battery inspection apparatus according to claim 3, wherein the battery under test comprises two first surfaces disposed opposite each other and first side surfaces connected to the two first surfaces, respectively, the first side surface being a side surface at which a tab of the battery under test is located, wherein the second rotation axis is perpendicular to the first surface; and
the rotation unit is configured to drive the tray to rotate such that a projection of the first side surface on a surface of the tray forms a first included angle $\alpha$ with the first direction, satisfying $0 \leq \alpha \leq 90°$.

5. The battery inspection apparatus according to claim 4, wherein the first included angle $\alpha$ satisfies $20° \leq \alpha \leq 45°$.

6. The battery inspection apparatus according to claim 2, wherein the tray bearing assembly comprises a plurality of trays spaced along the first direction, the translation unit drives the plurality of trays to translate such that to-be-inspected regions of batteries under test on two adjacent trays are both located within a ray range between the pulsed ray source and the detector, and the to-be-inspected region is located at a corner of the battery under test.

7. The battery inspection apparatus according to claim 6, wherein the translation unit is configured to make a minimum spacing $L_1$ between the batteries under test on the two adjacent trays along the first direction satisfy: $0 < L_1 \leq 2$ mm.

8. The battery inspection apparatus according to claim 2, wherein an absorption rate of the tray for the detection ray is less than a minimum absorption rate of the battery under test for the detection ray.

9. The battery inspection apparatus according to claim 8, wherein a material of the tray comprises carbon fiber.

10. The battery inspection apparatus according to claim 2, wherein the tray comprises a protective layer on a side surface facing towards the battery under test, and a surface roughness of the protective layer is less than a preset threshold.

11. The battery inspection apparatus according to claim 2, wherein the tray bearing assembly further comprises a plurality of stoppers movably connected to the tray and spaced apart, and the plurality of stoppers are configured to clamp the battery under test.

12. The battery inspection apparatus according to claim 2, wherein the battery inspection apparatus further comprises a rotary table, the pulsed ray source and the detector are fixedly connected to the rotary table, and the first, motor driven, assembly drives the rotary table to rotate along a circumferential direction of the first rotation axis.

13. The battery inspection apparatus according to claim 1, wherein the detector is a CMOS detector.

14. The battery inspection apparatus according to claim 1, wherein a maximum size of a focus of the pulsed ray source is less than or equal to 80 microns.

15. The battery inspection apparatus according to claim 1, wherein the battery inspection apparatus further comprises an image processing unit, wherein the image processing unit is in signal connection with the detector to identify detected images acquired by the detector.

16. A battery production device comprising the battery inspection apparatus according to claim 1.

17. A battery inspection method using the battery inspection apparatus according to claim 1, wherein the method comprises:
moving a battery under test to a preset position;
acquiring a plurality of detected images of a to-be-inspected region of the battery under test and identifying the detected images; and
determining an inspection result of the battery under test based on an identification result.

18. The battery inspection method according to claim 17, wherein the identifying the detected images comprises:
performing three-dimensional reconstruction on the detected images;
preprocessing slice images obtained from the three-dimensional reconstruction; and
capturing a vertex of a cathode and a vertex of an anode in the preprocessed image, drawing lines for the cathode and the anode, and determining a cathode-anode misalignment and a cathode-anode spacing value.

19. The battery inspection method according to claim 18, wherein the determining the inspection result of the battery under test based on an identification result comprises:
comparing the cathode-anode misalignment and the cathode-anode spacing value with a preset cathode-anode misalignment threshold and a preset cathode-anode spacing value threshold, respectively; and determining the inspection result of the battery under test based on a comparison result.

* * * * *